United States Patent [19]

Insley et al.

[11] 4,083,905

[45] Apr. 11, 1978

[54] OPEN MESH, RANDOM FIBER, CERAMIC STRUCTURE, MONOLITHIC CATALYST SUPPORT

[75] Inventors: Robert H. Insley, Royal Oak; Joseph Nemeth, St. Clair Shores; Paul E. Rempes, Jr., Royal Oak, all of Mich.

[73] Assignee: Champion Spark Plug Company, Toledo, Ohio

[21] Appl. No.: 571,602

[22] Filed: Apr. 25, 1975

[51] Int. Cl.$^2$ ............................................. C04B 33/34
[52] U.S. Cl. ..................................... 264/44; 252/449; 264/62; 264/63; 264/133
[58] Field of Search ....................... 264/43, 44, 60, 62, 264/131, 134, 63, 86, 137; 252/455 R, 449

[56] References Cited

U.S. PATENT DOCUMENTS

| | | | |
|---|---|---|---|
| 3,090,691 | 5/1963 | Weyer | 264/63 |
| 3,689,611 | 9/1972 | Hardy et al. | 264/44 |
| 3,877,973 | 4/1975 | Ravault | 264/62 |
| 3,880,972 | 4/1975 | Towne et al. | 264/86 |
| 3,883,444 | 5/1975 | Maselli et al. | 252/455 R |

*Primary Examiner*—Donald J. Arnold
*Assistant Examiner*—John A. Parrish
*Attorney, Agent, or Firm*—John C. Purdue

[57] ABSTRACT

The present invention provides a novel cellular ceramic catalyst support. The support consists of a random-fiber ceramic framework having a high surface area. The support is fabricated by flocking an organic sponge with wood or textile fibers, and impregnating the flocked sponge with a high alumina slurry containing a silicone resin and a flux. The impregnated organic sponge is sintered at a high temperature to burn out the organic sponge material. A fired high-silica glaze can be applied to the sintered article, followed by a second sintering step. A second glaze containing from 10–25 parts by weight CuO and from 10–25 parts by weight $ZrO_2$, can be applied, followed by a 2000° F. sintering step. The high temperature causes recrystallization of the CuO onto the surface of the catalyst support thereby increasing the surface area. The glazed surface can be plated with copper or nickel and combinations thereof to function as a reducing unit in a catalytic converter. In addition, other reduction catalysts and oxidation catalysts, e.g., platinum are compatible with the support.

5 Claims, No Drawings

OPEN MESH, RANDOM FIBER, CERAMIC STRUCTURE, MONOLITHIC CATALYST SUPPORT

BACKGROUND OF THE INVENTION

This invention relates to an improved cellular ceramic catalyst support.

Innumerable applications of catalytic phenomena, involving both organic and inorganic reactions, in liquid, gaseous and vapor phases, are common in modern industrial processing. Such catalytic reactions include oxidation reduction, dehydrogenation, cyclization, polymerization and dehydration reactions.

In addition to innumerable industrial processing applications, the recent emphasis on, and interest in energy conservation and pollution control has resulted in increased catalytic research activity in these areas. Such research activity into pollution control includes the control of both industrial pollution and control of emissions from internal combustion engines. Because of the rapid dependence of industrial processes upon petroleum products, and the large amount of known coal reserves in the Northern Hemisphere, research activity into efficient methods of coal gasification has increased.

Many industrial processing applications dependent upon catalytic reactions involve the use of catalysts in a static environment. In contrast, the use of catalytic materials to control exhaust emissions from internal combustion engines involve the use of such catalysts in a dynamic environment, under severe operating conditions.

Automobile manufacturers and associated industries have become increasingly concerned with the problem of controlling automobile exhaust emissions. Exhaust gases from internal combustion engines commonly contain unburned hydrocarbons, sulfur compounds, carbon monoxide, carbon dioxide and nitrogen oxides. Carbon monoxide is harmful because of its toxicity. In addition to being lacrimatory, $NO_2$ is more toxic than equal concentration of CO. Photochemical smog, the type that occurs in California, is due to the reaction between sunlight and unsaturated hydrocarbons (olefins) with nitrogen oxide. It causes eye irritation, general discomfort, poor visibility and plant damage.

Because of an increased awareness of and concern about the deleterious effects produced by discharge of untreated and uncontrolled exhaust from internal combustion engines, automotive manufacturers and associated industries have expended considerable effort to methods which will substantially reduce or eliminate air pollution from this source. In addition, increasingly stringent controls have been imposed by government regulatory agencies which will necessitate including a reactor to more completely convert hydrocarbons, CO and nitrogen oxides to the harmless end products, water, carbon dioxide and nitrogen. Because of this increased stringency, it is estimated that in the vicinity of 330 million dollars per year is being spent on research and development in order to meet the Federal Government's air pollutant emission standards for automobiles.

Studies have shown that increasing the air to fuel ratio lowers the HC and CO emission, but causes a drastic increase in the amount of nitrogen oxide emission. At a stoichiometric (14.5/1) air fuel ratio where HC and CO emissions are low, nitrogen oxide emissions are high.

In general, two approaches to the control of exhaust emissions are used:
(a) Thermal conversion devices, and
(b) Catalytic conversion devices.

Carbon monoxide and unburned hydrocarbons are major combustibles remaining in the incompletely burned post-combustion gas mixture. These products can be mixed with secondary injection air and thermally reacted in a combustion chamber separate from the engine's spark ignition chamber to control emissions. Such thermal conversion devices can effectively reduce carbon monoxide and hydrocarbons. However, oxides of nitrogen cannot be effectively treated by thermal conversion. In addition, because of space, heat, durability and fuel economy problems, the thermal converter does not appear to be as attractive a means as the catalytic converter for controlling both those pollutants which must be oxidized (HC and CO) and those which must be reduced ($NO_x$).

Although the ultimate nature of the catalyst used in a catalytic conversion device is not changed, it does undergo oxidation and reduction as:

$$NO + M \rightarrow MO + \tfrac{1}{2}N_2$$

$$MO + CO \rightarrow M + CO_2$$

to give the effective reaction which does not proceed spontaneously without the catalyst M:

$$NO + CO \rightarrow \tfrac{1}{2}N_2 + CO_2$$

Most catalysts are either reducers (they take oxygen from nitrogen oxides, designated as $NO_x$, to form $N_2$) or oxidizers (adding oxygen to unburned hydrocarbons and CO). In operation, a twin-bed system would be utilized, in which the exhaust would be routed to one converter for reduction, and to another for oxidation.

While the selection of a suitable catalyst is extremely important, the development of a catalyst support material and configuration is a prerequisite for an effective catalyst system. The catalyst carrier must possess the characteristics of high strength, high surface area, good thermal shock resistance, inertness to exhaust gas environment, inertness to the catalyst material and in addition must induce a low back pressure in the exhaust system.

Unsupported catalysts, i.e., where the catalyst is neither deposited on nor used to impregnate any carrier or support material have been suggested in the prior art. Use of such unsupported catalysts in a system having a large volume of gas flow suffers from numerous difficulties. For example the pellet beds suffer from pellet to pellet abrasion during use, causing attrition losses that result in particulate emission. In addition, the original particles of the catalyst metal or alloy tend to stick together, increasing the back pressure of the exhaust system to the extent that automobile drivability is adversely effected.

Furthermore, supported pellet beds offer low surface area for the bulk of ceramic that is necessary; the internal pores in conventional catalyst support materials do not provide useable surface at the extremely high space velocities (20,000–200,000 v/v/hour) experienced in the exhaust system.

The supported catalysts are generally supplied as spherical pellets or as monolithic structures such as honeycomb materials and foams. The honeycomb construction suffers from the disadvantage that because of straight-through flow channels, the residence time of the gases is insufficient for complete catalyzation. Foamed structures are very weak and result in excessively high back pressure in the exhaust system.

SUMMARY OF THE INVENTION

The instant invention is based upon the discovery of a novel catalyst carrier of a monolithic type. The cellular ceramic catalyst support has a randomly-oriented fiber ceramic structure consisting of a ceramic framework with a high surface area. A flocked organic sponge is impregnated with a high alumina slurry containing a silicone resin and a flux. The impregnated organic sponge is sintered to remove the organic material. The sintered article can be used as a catalyst support material. Optionally, the article can be coated with a high silica glaze and subjected to a second sintering step. A second coating, containing CuO and $ZrO_2$ can be applied. High temperature sintering caused recrystallization of the CuO on the surface, with $ZrO_2$ serving as a nucleating agent. The ceramic catalyst support can then be plated with copper or nickel or combinations thereof to function as a reducing unit in a catalytic converter. In addition, other reduction catalysts and oxidation catalysts, e.g., platinum are compatible with the support.

It is therefore, the primary object of the present invention to provide an improved cellular ceramic catalyst support.

DESCRIPTION OF THE PREFERRED EMBODIMENT

Samples of cellular ceramic catalyst supports were prepared according to the following procedure.

A liquid high-alumina slurry for impregnating an organic foam material was prepared by blending together the dry powder constituents, adding the liquid constituents and mixing to a smooth consistency:

|  | Percent by weight |
|---|---|
| Alumina | 60.5 |
| $SiO_2$ | 7.1 |
| $CaCO_3$—$MgCO_3$ (dolomite) | 2.5 |
| $CaCO_3$ (whiting) | 2.1 |
| Silicone Resin *(toluene solvent) | 27.8 |

*The resin used is commercially available from Dow Corning Corporation under the designation "2106 Resin".

The viscosity of the slurry was approximately 2500 centipoises. The viscosity of the slurry can be decreased if desired by addition of an organic thinner compatible with the silicone resin-toluene disclosed above. Compatible thinners include aromatic solvents such as xylene, alcohols and chlorinated solvents.

A sample of urethane sponge approximately 1 inch in diameter by ½ inch in length was coated with a plastic adhesive dissolved in a toluene-methyl ethyl ketone solvent. After coating the urethane sponge, the sponge was flocked by applying wood flour by means of a fluidized bed. The flocked urethane sponge was then immersed in the high-alumina slurry, squeezed and released until the sponge sample was thoroughly impregnated, and removed. The excess slurry was removed from the sample which was then air-dried for 24 hours, and oven dried for 1 hour at 200° F. The impregnated sample was then sintered by firing at a temperature of about 2450°–3100° F. for a minimum time period of about 3 hours. The sintering operation was sufficient to burn out the urethane sponge material and to vitrify the mullite slurry. After firing the above-described slurry the vitrified ceramic had a final composition of:

|  | Percent by weight |
|---|---|
| $Al_2O_3$ | 69.75 |
| $SiO_2$ | 27.42 |
| CaO | 2.21 |
| MgO | 0.62 |

The bulk density of the vitrified ceramic can be increased by the expedient of increasing the viscosity of the slurry. However, this expedient has a limit because of problems which arise with clogging of the pores of the sponge. The bulk density can also be increased by flocking the sponge with textile fibers such as cotton or rayon, or wood flour. The sponge is first coated with an adhesive to produce a tacky surface for bonding the fibers. The adhesive should also remain sufficiently resilient for impregnation with the ceramic slurry; an adhesive such as a polyurethane coating has the above described characteristics. The identity of the adhesive is unimportant; it need have only the characteristics referred to above.

The flocking can be accomplished by conventional methods such as spraying the fibers onto the tacky surface. However, use of a fluidized bed is preferred since it enables distribution of the fibers throughout the urethane sponge, increasing the surface area and strength of the vitrified ceramic.

The unglazed catalyst support has adequate strength and resistance to cracking and spalling to render it useful in diverse static applications. As described hereinbefore, if it is desired to use the catalyst support material in a dynamic environment, for example, in an internal combustion engine, increased strength and surface area of the support material is desirable. The following composition was prepared as a glaze for the sintered open-mesh support structure produced above:

| Glaze | Percent by weight |
|---|---|
| $SiO_2$ | 78.77 |
| $Al_2O_3$ | 14.97 |
| CaO | 4.22 |
| $Na_2O$ | 0.70 |
| $K_2O$ | 1.29 |

The support structure was immersed in the glaze and gently agitated for about 10 seconds, removed and air-dried. The support structure was dried at 900° F. for 15 minutes and glost-fired at about 2700° F. for a period of about 30 minutes.

In order to increase the surface area, the glazed support was then immersed in a second bath of coating material of the following composition:

| | |
|---|---|
| $SiO_2$ | 47.26 |
| $Al_2O_3$ | 8.99 |
| CaO | 2.54 |
| $Na_2O$ | 0.43 |
| $K_2O$ | 0.78 |
| CuO | 25.0 |
| $ZrO_2$ | 15.0 |

The structure was again dried at 900° F. and fired at 2100° F. for 5 minutes to produce a textured, high surface area exterior.

The support sample was tested for strength by a standard procedure which involved grinding the sample ends flat on a 45 μm abrasive wheel, padding the ends with blotting paper, and inserting the samples in a Tinius-Olsen testing machine. The compressive strength of the uncatalyzed specimen was calculated from the crushing load that caused a continuous fracture of the piece; a compressive load of 2400 ± 440 pounds per square inch was sustained.

The glazed support was then catalyzed by electrolessly plating with nickel to serve as the catalyst surface.

Gas flow tests indicate that honeycomb-configuration support catalysts always have laminar gas flow present whereas the supported catalyst configuration disclosed above, with open cells, forces gases to follow a tortuous path.

The cellular supported catalyst produced as described above performed well as a reduction exhaust catalyst. The resultant gas flow is non-directional and non-laminar, and increases the probability of contact between the post-combustion mixture and the catalyst. Attrition losses and build-up of back pressure, a major drawback of pellet beds, are minimized due to the monolithic configuration. In addition, the flocking and the glazing steps described increase the surface area by a factor of 2 or 3 over an equal volume of a pellet bed.

The preferred embodiment is described in greater detail below.

The organic sponge used in the instant invention must be capable of being impregnated with the ceramic slurry. A number of commercially available open-cell, organic sponge materials, such as cellulose sponge or polyurethane foam sponge are useable in the instant invention. The sponge must have a uniform open-cell structure; this allows uniform "pick-up" of the ceramic slurry by the sponge. The polyurethane foam is available in a large variety of open-cell sizes; a sponge having approximately 8 to 80 pores per inch has been found to produce excellent results when used with the ceramic slurry disclosed. The pick-up of the ceramic slurry by the organic sponge can be easily accomplished by immersing the sponge in the slurry and alternately compressing and permitting the sponge to expand until the slurry has been extended throughout the sponge material.

For example, a suitable urethane sponge material is available from Scott Paper Company under the trade designation "Scott Q-Foam". Other suitable urethane sponge materials are also available from the Scott Paper Company under the trade designation "Thirsty Foam", and "Z-Foam". The foam sponge was subsequently flocked with wood flour in a fluidized bed. Impregnation of the flocked urethane sponge produces a roughly textured surface having increased surface area for higher catalytic material, increased ceramic pickup for high strength, and an improved base to form a mechanical bond for the catalytic surface to be deposited.

Extensive testing has shown that the composition of the ceramic slurry is extremely important. The slurry must have good workability and upon sintering must form a vitrified body of low thermal expansion to provide sufficient shock resistance. The ceramic slurry must contain enough ceramic material to form a ceramic body on the bed of the sponge material, and at the same time must not "overload" the sponge material and cause clogging of the pores. The preferred viscosity range for the ceramic slurry used in the instant invention is from 300–3,000 centipoises.

In order to perform successfully as a catalytic converter under severe operating conditions, the vitrified ceramic cellular structure must have sufficient refractoriness along with low thermal expansion to resist both attrition loss and thermal shock. Accordingly, studies were conducted to maximize the strength of the vitrified ceramic. These tests included investigation of various compositions along the mullite-cordierite tie-line of the $MgO-Al_2O_3-SiO_2$ phase diagram. The tests indicated that even a 25 percent cordierite addition decreased the mullite strength to unsuitable levels.

The slurry requires a fluxing material to promote reaction to the desired composition after the sintering operation. From ½ to 4 percent by weight, preferably about 3 percent by weight is present. A combination of calcium-magnesium carbonate and calcium carbonate, which provides a CaO-MgO flux during the firing step is preferred. CaO-MgO may be added as a flux, but for economic reasons, use of $CaCO_3-MgCO_3$ is preferred. $CaO-MgO-SiO_2$ bodies have a eutectic at 78 percent CaO:22 percent MgO. Tests were conducted on a series of bodies containing increasing percentages of the eutectic. Samples containing the flux in amounts greater than about 4 percent by weight deformed during sintering; the highest compressive strength was obtained on samples containing about 3 percent by weight flux.

A $CaCO_3-MgCO_3$ dolomitic limestone, suitable for use in the instant invention is available from Ohio Lime Company under the trade designation "Stonelite". "Stonelite" is described as a 300 mesh limestone containing about 54.7 percent $CaCO_3$, 44.7 percent $MgCO_3$, the remainder being $Fe_2O_3$, $SiO_2$ and $Al_2O_3$. The $CaCO_3-MgCO_3$ can be adjusted to a 78:22 ratio by addition of whiting. A useable compositional range for a ceramic slurry including a $CaCO_3-MgCO_3$ flux, is listed below:

|  | Range-Percent by weight |
| --- | --- |
| $Al_2O_3$ | 50–90 |
| $SiO_2$, silicone resin | 10–45 |
| $CaCO_3—MgCO_3$, $CaCO_3$ | Remainder |

In addition to the $CaCO_3-MgCO_3$ flux described above, other compounds have been used as fluxing agents in the ceramic slurry. Compounds such as $MnO_2$ (up to 2 percent by weight) $BaB_2O_4$, $MnO_2.TiO_2$ and $V_2O_5$ have been successfully incorporated into the slurry composition.

The silicone resin performs as a binder in the slurry; the binder gives the slurry a good working time by increasing the setting rate. In addition, the slurried article has good structural integrity during the sintering operation. The silicone resin additionally provides silica for the vitrified article, to help adjust the $Al_2O_3:SiO_2$ ratio during the sintering operation. As indicated above in the compositional range given, the total amount of $SiO_2$ present in the vitrified article is derived from the $SiO_2$ and silicon resin present.

Organic silicone materials which are suitable for use in the instant invention are disclosed in U.S. Pat. Nos. 3,090,691 and 3,108,985. Particularly useful in the instant invention are phenyl lower alkyl silicone resins wherein the total of phenyl and lower alkyl groups divided by the number of silicon atoms is from 0.9 to 1.5. Preferably, the alkyl group has not more than 4 carbon atoms. In particular, the silicon resin available from Dow Corning Corporation under the trade designation "2106 Resin" is suitable; this resin is described as having the following properties:

ASTM — D — 1346 Solids Content (3 hours at 275° F.) ... 59 minimum

ASTM — D — 445 Viscosity (At 77° F.)... 20–50

Glazing of the vitrified cellular support increases the strength, minimizes dusting and serves as a glassy base for the deposition of catalytic materials. Application of the Cu-$ZrO_2$ high surface area coating allows the electroless plating to be conducted without the necessity for a preliminary acid-etching step. Although acid-etching improves the mechanical adherence of the nickel or copper, it is undesirable because it also drastically decreases the strength of the support.

Catalytic metal combinations such as nickel on copper, copper on nickel, nickel-copper-nickel, and copper-nickel-copper can be used as reduction catalysts. The order of metal plating of the copper and nickel does not appear to effect catalytic activity. The catalytic coating can be accomplished by electroless plating of the nickel and copper, or by vapor deposition of nickel. However, plating of the nickel as a base for the copper does not appear to be slightly advantageous in that less oxide formation is observed in comparison to plating of the copper on the substrate. Copper plating on the substrate is accompanied by a greater amount of oxide formation, and a tendency to "dusting" of the catalytic metal.

The glazed surface can be catalyzed with platinum to serve as an oxidation catalyst. For example, chloroplatinic acid can be incorporated in the glaze. However, because platinum is insoluble in oxides, segregation of the glaze occurs through the structure, and results in formation of nodules on the surface.

Since catalyst support materials must function under severe operating conditions, the catalytic material must be strongly bonded to the glazed vitrified substrate in order to prevent cracking and subsequently friability at elevated temperatures. In addition to the problem of mechanical adherence, at elevated temperatures of 1800° F. and above, it is imperative that no aluminate or silicate formation due to catalyst-support reactions, occur. The formation of $NiAl_2O_4$ as a result of reaction between Ni or NiO and $Al_2O_3$ appears to decrease the bond strength so that the NiO spalls from the exterior of the substrate. Cristobalite formation is extremely undesirable because of the large volume change which cristobalite undergoes upon prolonged heating; free silica also appears to deleteriously effect catalyst activity.

This problem with aluminate and silicate formation due to undesirable catalyst-support reactions is largely eliminated by careful adjustment of the ceramic slurry to form stoichiometric mullite with an addition of a eutectic flux of 78 percent CaO, 22 percent MgO.

Since the high surface area coating also contains silica and alumina, its compositional range is also extremely important. During firing of the glaze, the CuO present in the glaze appears to be recrystallized as CuO onto the substrate surface. It is theorized that the $ZrO_2$ acts as a nucleating agent in the recrystallization of the CuO.

As discussed hereinbefore, the catalyst support material must be capable of withstanding severe operating temperatures. Because of this, the glaze coating must be a high-temperature coating. A suitable glaze can have about the following compositional range:

|  | Range-Percent by weight |
| --- | --- |
| $SiO_2$ | 60–80 |
| $Al_2O_3$ | 2–15 |

The remainder of the glaze composition can consist of alkali metal oxides, borates and alkaline earth compounds.

The second glaze coating composition can vary within the limits described above for the first glaze coating but in addition must contain from about 10–25 parts by weight $ZrO_2$ and from about 10–25 parts by weight CuO.

What we claim is:

1. A method for producing a cellular ceramic catalyst support which comprises the steps of coating an open-celled organic sponge with an adhesive to produce a tacky surface, flocking the tacky surface with a material selected from the group consisting of rayon and cotton fibers and wood flour, impregnating the flocked organic sponge with a slurry having a viscosity of from 300 to 3000 centipoises and consisting essentially of from 50 to 90 percent by weight alumina, from ½ to 4 percent by weight of a flux and from 10 to 45 percent by weight silicone resin which consists essentially of a phenyl lower alkyl silicone resin wherein the total of phenyl and lower alkyl groups divided by the number of silicone atoms is from 0.9 to 1.5 and each alkyl group has not more than 4 carbon atoms, and sintering the impregnated organic sponge at a temperature between 2450°–3100° F. for a period of time sufficient to burn out the organic sponge material and to vitrify the slurry.

2. A method for producing a cellular ceramic catalyst support which comprises the steps of coating an open-called organic sponge with an adhesive to produce a tacky surface, flocking the tacky surface with a material selected from the group consisting of rayon and cotton fibers and wood flour, impregnating the flocked organic sponge with a slurry having a viscosity of from 300 to 3000 centipoises and consisting essentially of from 50 to 90 percent by weight alumina, from ½ to 4 percent by weight of a flux and from 10 to 45 percent by weight silicone resin which consists essentially of a phenyl lower alkyl silicone resin wherein the total of phenyl and lower alkyl groups divided by the number of silicone atoms is from 0.9 to 1.5 and each alkyl group has not more than 4 carbon atoms, sintering the impregnated organic sponge at a temperature between 2450°–3100° F. for a period of time sufficient to burn out the organic sponge material and to vitrify the slurry, coating the sintered article with a high silica glaze consisting essentially of from 60 to 80 parts by weight $SiO_2$, and from 2 to 15 parts by weight $Al_2O_3$, the remainder being calcium, sodium and potassium oxides, and heating the article to a temperature of about 2700° F. to provide thereon a glazed pore-free surface.

3. A method for producing a cellular ceramic catalyst support which comprises the steps of coating an open-celled organic sponge with an adhesive to produce a tacky surface, flocking the tacky surface with a material selected from the group consisting of rayon and cotton fibers and wood flour, impregnating the flocked organic sponge with a slurry having a viscosity of from 300 to 3000 centipoises and consisting essentially of from 50 to 90 percent by weight alumina, from ½ to 4 percent by weight of a flux and from 10 to 45 percent. by weight silicone resin which consists essentially of a phenyl lower alkyl silicone resin wherein the total of phenyl and lower alkyl groups divided by the number of silicone atoms is from 0.9 to 1.5 and each alkyl group has not more than 4 carbon atoms, and sintering the impregnated organic sponge at a temperature between 2450°–3100° F. for a period of time sufficient to burn out the organic sponge material and to vitrify the slurry, coating the sintered article with a high silica glaze consisting essentially of from 60 to 80 parts by weight $SiO_2$, and from 2 to 15 parts by weight $Al_2O_3$, the remainder being calcium, sodium and potassium oxides, heating the article to a temperature of about 2700° F. to provide thereon a glazed pore-free surface, coating the glazed article with a coating consisting essentially of from 60 to 80 parts by weight $SiO_2$, from 2 to 15 parts by weight $Al_2O_3$, from 10 to 25 parts by weight CuO, and from 10 to 25 parts by weight $ZrO_2$, the remainder being calcium, sodium and potassium oxides, and heating the coated article to about 2100° F. to provide thereon a textured surface.

4. A method for producing a cellular ceramic catalyst support which comprises the steps of coating an open-celled organic sponge with an adhesive to produce a tacky surface, flocking the tacky surface with a material selected from the group consisting of rayon and cotton fibers and wood flour, impregnating the flocked organic sponge with a slurry having a viscosity of from 300 to 3000 centipoises and consisting essentially of from 50–90 percent by weight alumina, from ½ to 4 percent by weight of a CaO-MgO flux, present in a ratio of 78 percent CaO and 22 percent MgO by weight, said flux being provided by $CaCO_3$ and $MgCO_3$, and from 10 to 45 percent by weight silicone resin which consists essentially of a phenyl lower alkyl silicone resin wherein the total of phenyl and lower alkyl groups divided by the number of silicon atoms is from 0.9 to 1.5 and each alkyl group has not more than 4 carbon atoms, sintering the impregnated organic sponge at a temperature between 2450°–3100° F. for a period of time sufficient to burn out the organic sponge material and to vitrify the slurry, coating the sintered article with a high silica glaze consisting essentially of from 60 to 80 parts by weight $SiO_2$, and from 2 to 15 parts by weight $Al_2O_3$, the remainder being calcium, sodium and potassium oxides, heating the article to a temperature of about 2700° F. to provide thereon a glazed pore-free surface, coating the glazed article with a coating consisting essentially of from 60 to 80 parts by weight $SiO_2$, from 2 to 15 parts by weight $Al_2O_3$, from 10 to 25 parts by weight CuO, and from 10 to 25 parts by weight $ZrO_2$, the remainder being calcium, sodium and potassium oxides, and heating the coated article to about 2100° F. to provide thereon a textured surface.

5. A method for producing a cellular ceramic catalyst support which comprises the steps of coating an open-celled organic sponge with an adhesive to produce a tacky surface, flocking the tacky surface with a material selected from the group consisting of rayon and cotton fibers and wood flour, impregnating the flocked organic sponge with a slurry having a viscosity of from 300 to 3000 centipoises and consisting essentially of about 60 percent by weight alumina, about 7 percent by weight $SiO_2$, from ½ to 4 percent by weight of a CaO-MgO flux, present in a ratio of 78 percent CaO and 22 percent MgO by weight, said flux being provided by $CaCO_3$ and $MgCO_3$, and about 28 percent by weight silicone resin which consists essentially of a phenyl lower alkyl silicone resin wherein the total of phenyl and lower alkyl groups divided by the number of silicon atoms is from 0.9 to 1.5 and each alkyl group has not more than 4 carbon atoms, and sintering the impregnated organic sponge at a temperature between 2450°–3100° F. for a period of time sufficient to burn out the organic sponge material and to vitrify the slurry, coating the sintered article with a high silica glaze consisting essentially of about 79 parts by weight $SiO_2$, and about 15 parts by weight $Al_2O_3$, the remainder being calcium, sodium and potassium oxides, heating the article to a temperature of about 2700° F. to provide thereon a glazed pore-free surface, coating the glazed article with a coating consisting essentially of about 47 parts by weight $SiO_2$, about 9 parts by weight $Al_2O_3$, about 25 parts by weight CuO, and about 15 parts by weight $ZrO_2$, the remainder being calcium, sodium and potassium oxides, and heating the coated article to about 2100° F. to provide thereon a textured surface.

* * * * *